United States Patent
Steinhoff et al.

(10) Patent No.: US 9,782,809 B2
(45) Date of Patent: Oct. 10, 2017

(54) METHOD FOR MANUFACTURING A ROLL FOR HOT OR COLD ROLLING OF FLAT METAL PRODUCTS

(71) Applicant: Steinhoff GmbH & Cie. OHG, Dinslaken (DE)

(72) Inventors: Karl Steinhoff, Dinslaken (DE); Carl Justus Heckmann, Dusseldorf (DE)

(73) Assignee: Steinhoff GmbH & Cie. OHG, Dinslaken (DE)

( * ) Notice: Subject to any disclaimer, the term of this patent is extended or adjusted under 35 U.S.C. 154(b) by 0 days.

(21) Appl. No.: 15/321,815

(22) PCT Filed: Jun. 18, 2015

(86) PCT No.: PCT/EP2015/063733
§ 371 (c)(1),
(2) Date: Dec. 23, 2016

(87) PCT Pub. No.: WO2014/197466
PCT Pub. Date: Dec. 30, 2015

(65) Prior Publication Data
US 2017/0144205 A1  May 25, 2017

(30) Foreign Application Priority Data
Jun. 24, 2014 (DE) .......................... 10 2014 108 823

(51) Int. Cl.
*B21B 27/03* (2006.01)
*B23K 20/02* (2006.01)
(Continued)

(52) U.S. Cl.
CPC .......... *B21B 27/032* (2013.01); *B23K 20/021* (2013.01); *B23K 37/06* (2013.01);
(Continued)

(58) Field of Classification Search
CPC ... B21B 27/032; B21B 2267/26; B23K 37/06; B23K 20/021; B23K 2201/06;
(Continued)

(56) References Cited

U.S. PATENT DOCUMENTS

| 2004/0040358 A1 | 3/2004 | Seidel et al. |
| 2012/0175076 A1 | 7/2012 | Seidel et al. |

FOREIGN PATENT DOCUMENTS

| DE | 102009037278 A1 | 2/2011 |
| EP | 1365869 A1 | 12/2003 |

(Continued)

*Primary Examiner* — Sarang Afzali
(74) *Attorney, Agent, or Firm* — The Webb Law Firm

(57) ABSTRACT

A method for manufacturing a roll for rolling flat metal products having a barrel section coated with a wear-resistant layer and journals formed thereon, and a main body blank which includes a barrel section and two blank journal sections The barrel section is encased with a jacket which is connected, with its edge regions associated with the blank journal sections, in a sealed manner, to the associated end faces of the blank journal sections, and limits a cavity surrounding the barrel section. The cavity is filled with an alloy powder. The wear-resistant layer coating of the barrel section, which forms a substance-to-substance bond with said barrel section, is then formed from said alloy powder through hot isostatic pressing. The jacket is then removed from the barrel section, the blank journal sections are formed into the journals and the barrel section and the journals are finished.

10 Claims, 5 Drawing Sheets

(51) Int. Cl.
 *B23K 37/06* (2006.01)
 *B23K 101/06* (2006.01)
(52) U.S. Cl.
 CPC ....... *B23K 2201/06* (2013.01); *Y10T 29/4956* (2015.01); *Y10T 29/49565* (2015.01); *Y10T 29/49982* (2015.01)
(58) Field of Classification Search
 CPC .. B23H 9/04; B02C 4/305; B24B 5/37; B29C 43/18; Y10T 29/49544; Y10T 29/4956; Y10T 29/49565; Y10T 29/4998; Y10T 29/49982; Y10T 29/49984
 See application file for complete search history.

(56) References Cited

FOREIGN PATENT DOCUMENTS

| | | |
|---|---|---|
| JP | 56152908 A | 11/1981 |
| JP | 6352703 A | 3/1988 |
| JP | 4100614 A | 4/1992 |
| JP | 2004148321 A | 5/2004 |
| JP | 2006122978 A | 5/2006 |
| WO | 2014001024 A1 | 1/2014 |

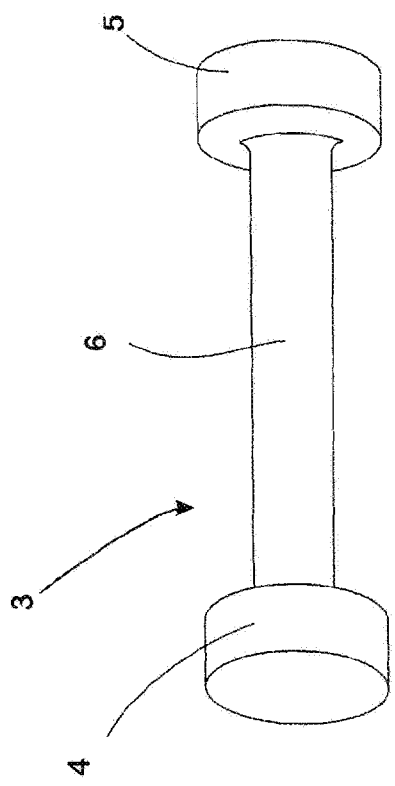
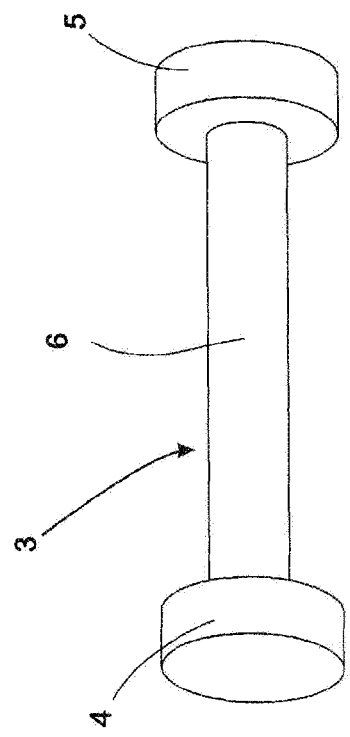
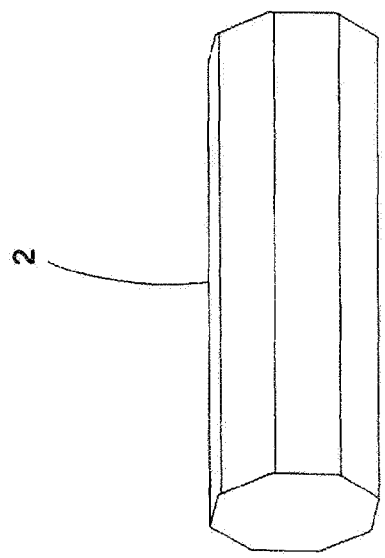

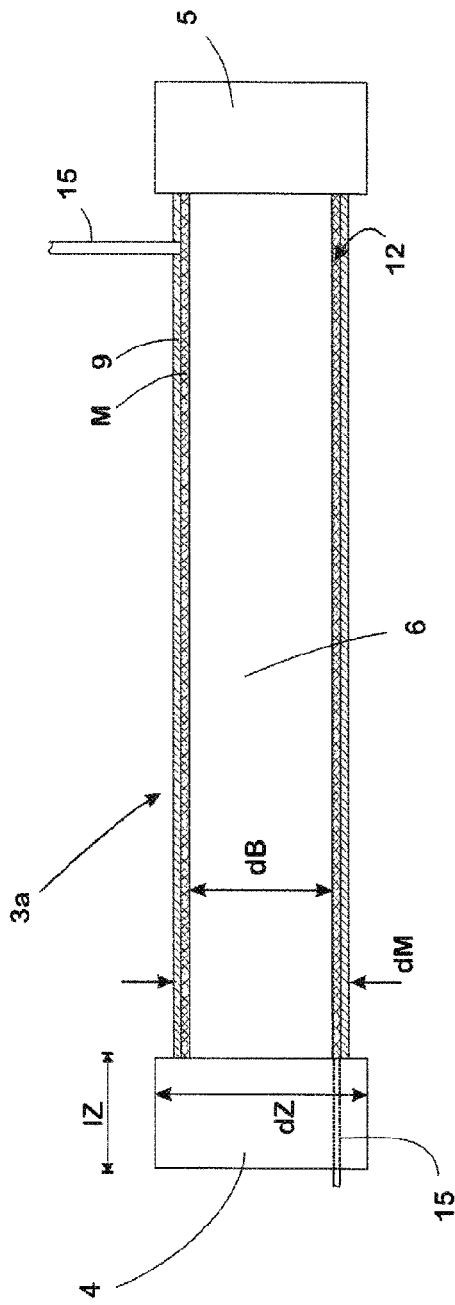
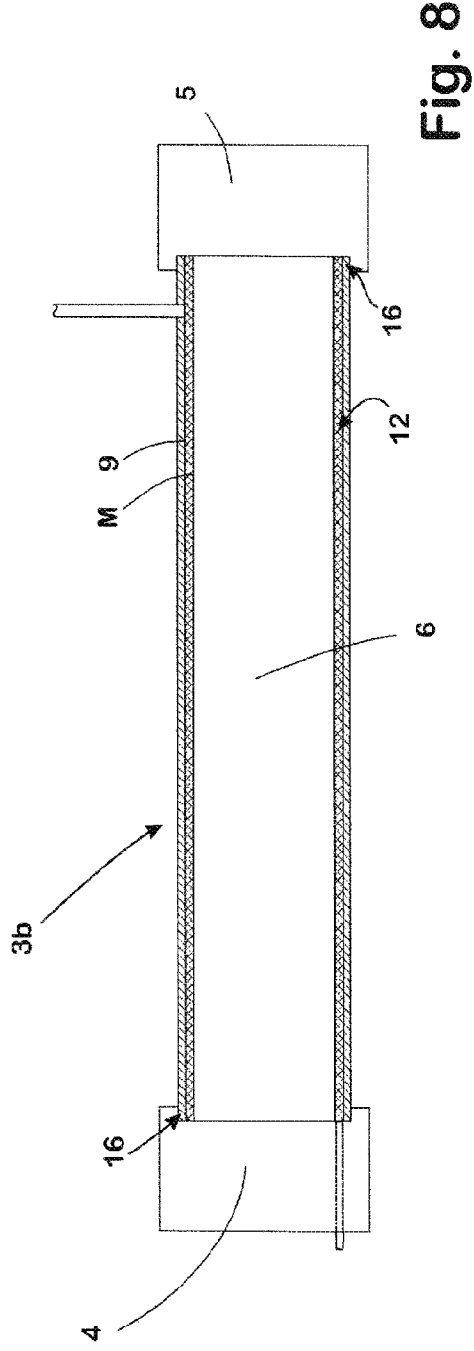

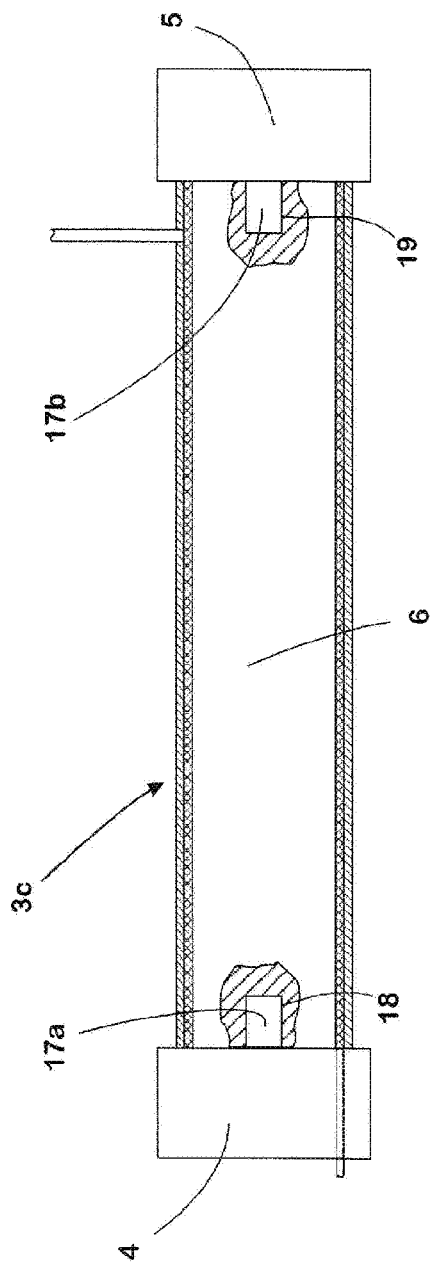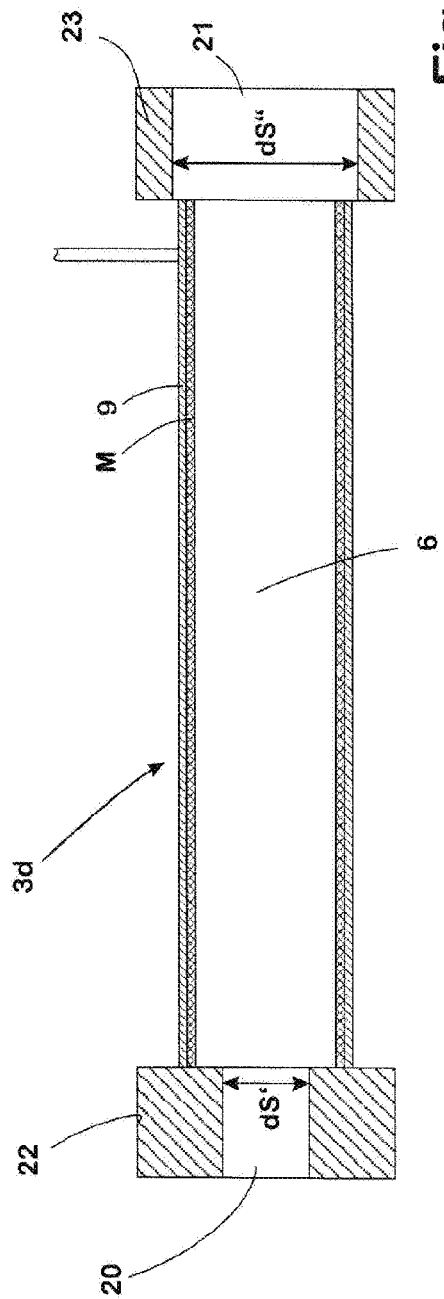

METHOD FOR MANUFACTURING A ROLL FOR HOT OR COLD ROLLING OF FLAT METAL PRODUCTS

CROSS-REFERENCE TO RELATED APPLICATIONS

This application is the United States national phase of International Application No. PCT/EP2015/063733 filed Jun. 18, 2015, and claims priority to German Patent Application No. 10 2014 108 823.9 filed Jun. 24, 2014, the disclosures of which are hereby incorporated in their entirety by reference.

BACKGROUND OF THE INVENTION

Field of the Invention

The invention relates to a roll and a method for manufacturing a roll for hot or cold rolling of flat metal products, wherein the roll has a barrel section which is coated with a wear-resistant layer and two journals oriented coaxially with the barrel section, one of which is in each case formed on one of the end faces of the barrel section.

Description of Related Art

Flat metal products which are cold or hot rolled using such rolls typically include strips, sheets or products cut from these which consist of steel or non-ferrous metal.

In practice, rolls used for flat metal products are, on the one hand, subjected to high dynamic forces as a result of the rolling forces occurring during rolling and are on the other hand subject to high wear in the region of their circumferential surfaces which come into contact with the rolled material.

In order to increase the service life of work rolls used for the hot rolling of hot steel strip, in DE 10 2009 037 278 A1 it has been suggested that a work roll which is used in a stand for the finish hot rolling of hot steel strip be provided with a wear-resistant layer consisting of powder-metallurgical material through hot isostatic pressing, also referred to in the technical jargon as "HIP". A comparable suggestion can be found in EP 1 365 869 B1, according to which, in order to increase its resistance to wear, the work roll, also used for hot rolling, is provided with a layer applied using the HIP method.

During the manufacture of such work rolls, a main body consisting of cast iron or a suitable steel is first produced through casting or forging which comprises a barrel region which comes into contact with the rolled material in use and bearing journals via which the roll is mounted in the roll stand. The materials of the main body thereby exhibit mechanical properties which are optimally matched to the force loads which occur in practical use.

The main body prefabricated in this way is then encased in a sheet metal capsule. This is dimensioned such that a cavity surrounding the main body is formed between its inner circumferential surface and the circumferential surface of the barrel. This cavity is filled with an alloy powder. The sheet metal capsule is then sealed in a gas-tight manner. Compression then takes place under high pressure on all sides and at high temperature. The pressure and temperature are thereby adjusted such that the powder is compressed and sintered. In this way, a completely dense layer is formed on the main body in which the individual powder particles are sintered not only with each other but also with the main body, so that a homogeneous composite body is produced. Following the end of the hot isostatic pressing, the sheet metal capsule is removed. Finally, a thermal aftertreatment can take place in order to provide the obtained composite roll with the required mechanical properties. As a rule, a mechanical final processing also takes place in order to guarantee the required dimensional accuracy.

Modern roll trains are subject to increasingly demanding requirements in terms of the width of the rolled material which is to be processed. Accordingly, increasingly long rolls must be made available in order to allow greater widths to be rolled reliably. It proves problematic here that the coating of such long rolls using the HIP method involves considerable complexity. For example, the complexity of the equipment required for the hot isostatic pressing increases disproportionately with increasing length of the rolls. HIP plants which are currently available are therefore so limited in their length that they can no longer be used to process rolls the dimensions of which reflect the current requirements of roll train operators.

In order to solve this problem it has been suggested, in WO 2014/001024 A1, for the manufacture of rolls for cold or hot rolling of flat metal products, first to manufacture a main body which only extends over the barrel region of the roll which is to be manufactured, then to coat this main body with a wear-resistant layer through hot isostatic pressing and only then to weld to the main body the journals required in order to mount the roll rotatably in the roll stand. The fact that, according to this suggestion, the journals are only joined with the main body after the hot isostatic pressing means that the full length of the available HIP plants can be used for the HIP coating of the barrel region, whereas in a conventional approach not only the barrel region but also the journals formed onto the barrel region of the main body need to be accommodated in the HIP plant.

SUMMARY OF THE INVENTION

Against the background of the prior art explained above, an object of the invention was to provide a method with which a roll suitable for the hot or cold rolling of flat metal products can be manufactured cost-effectively which, with a maximised length, possesses optimal mechanical properties and an equally optimised resistance to wear.

Another object was also to create a roll intended for the hot or cold rolling of flat metal products which exhibits such a range of properties.

With regard to the method, the invention has solved this problem in that the method steps disclosed are followed during the manufacture of a roll intended for cold or hot rolling.

With regard to the roll, the aforementioned problem is solved according to the invention disclosed herein.

The method according to the invention is thus used in manufacturing a roll for the hot or cold rolling of flat metal products, wherein the roll comprises a barrel section, which is coated with a wear-resistant layer, and two journals, oriented coaxially with the barrel section, one of which is in each case formed on one of the end faces of the barrel section. According to the invention, such a roll can be manufactured, in a great length, in an operationally reliable manner and making optimum use of the available equipment technology in that the following working steps are followed:
a) Provision of a main body blank on which
 a barrel section, which has an elongated cylindrical basic form and which consists of a main body material, and
 two blank journal sections are provided, one of which is
  in each case formed on one of the end faces of the barrel
  section and which each have a larger diameter than the
  barrel section, wherein the material volume of the blank journal sections is at least equal to the volume of the journal of the finished roll associated with the respective end face;

b) encasing the barrel section with a tubular-formed jacket, wherein the jacket is connected, with its edge regions associated with the blank journal sections, in a sealed manner, to the associated end faces of the blank journal sections, and a cavity surrounding the barrel section is formed between the jacket and the barrel section;

c) filling the cavity with an alloy powder;

d) hot isostatic pressing of the alloy powder in order to form the wear-resistant layer coating the barrel section which forms a substance-to-substance bond with the barrel section from the alloy powder through compression and sintering;

e) removing the jacket from the barrel section;

f) forming the blank journal sections into the journals;

g) finishing of the barrel section and the journals.

The method according to the invention starts out with a main body blank on which not only the barrel section, but also the blank journal sections, from which the journals of the roll which is to be produced are formed during the further course of the method, have already been formed. This procedure has the decisive advantage that, in the finished roll, a main body formed in a single piece is realised in which no joint zones, zones of thermal influence or similar are present which can form the starting point for the development of cracks or similar. Instead, in a roll manufactured in a manner according to the invention, the journals and the barrel section in each case form a substance-to-substance bond with one another over the entire region of the cross section over which the respective journals and the associated end face of the barrel section abut one another. Moreover, the forming of the blank journal sections which takes place following the coating of the barrel section has the advantage that the journals display a parameter curve of properties over their entire cross section and their entire main length which makes them particularly suitable for absorbing the force loads occurring during operation of the roll. The forming of the respective blank journal section can expediently take place through forging.

Irrespective of how they are in each case created, the blank journal sections provided on a main body blank according to the invention must in each case be dimensioned such that their volume corresponds at least to the volume of the journal of the finished roll which is in each case to be formed out of them. Ideally, the blank journal sections are assumed to have a certain excess volume in comparison with the volume of the finished journals, in order to have sufficient material available for the mechanical finishing.

Since the volume of the blank journal sections is distributed over a significantly greater diameter than the volume of the journals, the blank journal sections are significantly shorter in length, viewed in the direction of the longitudinal axis of the roll and of the main body blank, than the journals which are to be formed out of them. Accordingly, the length of the main body blank required for the journals which is "saved" in this way can be added to the barrel section. In this way, according to the invention the plant size available for the hot isostatic pressing can be used to coat significantly longer—in comparison with the conventional approach—barrel sections of rolls intended for hot or cold rolling with a powder-metallurgically created wear-resistant layer. At the same time the rolls produced and finished according to the invention exhibit optimal properties in use, since the barrel section and the journals of its main body form a material unit in the finished condition without welding or other measures needing to be carried out which can lead to a weakening of components.

The diameter of the blank journal sections of a main body blank provided according to the invention is thereby to be dimensioned, relative to the longitudinal axis of the roll which is to be manufactured or of the main body blank, such that the jacket which is laid around the barrel section of the main body in working step b) of the method according to the invention abuts, with its associated edge region, against the associated end face of the blank journal sections. In this way a simple gas-tight sealing of the jacket is possible. Since the jacket usually consists of a sheet metal material, this can be achieved by welding the relevant edge region of the jacket together with the associated end face of the respective journal section.

The surrounding cavity between the jacket and the barrel section of the main body blank which is present following jacketing is now filled with a suitable alloy powder. The alloys standardised under the material numbers 1.3394 or 1.3292 are typically used for this purpose. The filling can take place in any suitable manner. For example, it is conceivable for the powder to be introduced into the cavity via a pipe passed through the jacket. Naturally, several such filling types can also be provided which if necessary direct a jet of alloy powder into the cavity at different angles of attack in order to guarantee an even filling. It is also conceivable for the filling of the cavity surrounding the barrel section to take place via a feed pipe which is passed through one of the blank journal sections.

The hot isostatic pressing of the alloy powder filled into the cavity surrounding the barrel section can take place in an essentially known manner through application of a sufficient pressure of for example 100-200 bar and sufficient heat input, through which the powder together with the barrel section is brought to temperatures of up to 1500° C. The aim is to form a wear-resistant layer coating the barrel section and forming a substance-to-substance bond with the barrel section from the alloy powder through compression and sintering.

Following the hot isostatic pressing, the jacket is removed, exposing the wear-resistant coating formed on the barrel section of the main body.

The journals can now be formed from the blank journal sections in the manner already explained above.

Finally, the finishing of the barrel section and the journals takes place. For this purpose, the journals or the barrel section are if necessarily subjected to a thermal treatment comprising austenitisation and annealing in order to adjust their mechanical properties, as well being mechanically processed through machining methods in order to fulfil the requirements in terms of surface quality and dimensional accuracy.

Usually, the main bodies of rolls of the type in question here are manufactured of steel or cast iron. A material suitable for this purpose is standardised under the material number 1.2602.

Here too, it is conceivable for the main body blank with its barrel section and its blank journal sections to be manufactured in a single piece through a primary forming method, in particular casting.

It is also possible first to cast a billet-formed cast blank or similar and then to form this into the cast blank through forging. Here too, the barrel section and the blank journal sections can be formed in a single piece from the cast blank.

A further possibility for the manufacture of the main body blank embraced by the invention consists of manufacturing the barrel section and the blank journal sections of the main body blank separately from one another and subsequently connecting them inseparably with one another. The inseparable connection can for example be achieved in that the blank journal sections and the barrel section are coupled with one another via pins engaging in corresponding recesses such that the two parts form a substance-to-substance bond with one another through the heating which takes place during hot isostatic pressing as a result of solid body diffusion.

Irrespective of how the main body blank is produced, it is usually mechanically processed prior to hot isostatic pressing such that optimal preconditions are created for achieving a dimensional accuracy of the roll which is to be manufactured which satisfies the strictest requirements.

If, in a roll according to the invention, a surface layer with particular properties, for example with increased resistance to wear, is also to be produced in the region of the journals, this can be achieved in that the barrel section of the main body blank carries a journal stub on at least one of its end faces and the blank journal section is created on the relevant end face in that the journal stub is enclosed by a jacket filled with an alloy powder and that the alloy powder surrounding the journal stub is compressed and sintered through hot isostatic pressing, so that it forms a substance-to-substance bond with the journal stub and together with the journal stub forms the blank journal section.

Fundamentally, the respective journal stub can have a diameter which is less than the diameter of the barrel section. In this case, in order to create the blank journal section the journal stub is provided with an encapsulation consisting of sheet metal which models the form of the blank journal section and against which the jacket of the barrel section is sealed. However, if the surface layer of the journal is to be limited to a small thickness, then for this purpose the diameter of the journal can be dimensioned such that it is larger than the diameter of the barrel section. This variant has the additional advantage that the jacket of the barrel section can be sealed against the solid material of the journal stub.

The alloy powders used, respectively, for the coating of the journal stub and of the barrel section can be so matched that the layers formed thereof in the region of the journals and of the barrel section respectively fulfil the applicable requirements optimally. For this purpose it can be expedient to use different compositions of alloy powder for the coating of the journal and of the barrel. Examples of suitable alloy powders for forming the layer on the journals are the powders with alloys standardised under the material number 1.3344 or under the material number 1.3394.

In a comparable way it is possible to form at least one of the blank journal sections of the main body blank in that the barrel section of the main body blank carries a journal stub on at least one of its end faces and that a ring section is fixed to this journal stub which, together with the journal stub, forms the blank journal section.

Consequently, a roll for cold or hot rolling of flat metal products according to the invention with a main body which comprises a barrel section and journals formed on its end faces, said barrel section possessing a wear-resistant coating created through hot isostatic pressing, is characterised in that the journals are formed through forging following application of the wear-resistant coating and have then been mechanically finished.

BRIEF DESCRIPTION OF THE DRAWINGS

The invention is explained in more detail in the following with reference to a drawing illustrating exemplary embodiments, wherein, in each case schematically and not to scale:

FIG. 1 shows a pre-forced cast blank in a perspective view;

FIG. 2 shows a main body blank produced from the cast blank through forging in a perspective view;

FIG. 3 shows the main body blank following mechanical machining in a perspective view;

FIG. 7 shows a further main body blank prepared for hot isostatic pressing in longitudinal section;

FIG. 8 shows a third main body blank prepared for hot isostatic pressing in longitudinal section;

FIG. 9 shows a fourth main body blank prepared for hot isostatic pressing in longitudinal section;

FIG. 10 shows a fifth main body blank prepared for hot isostatic pressing in longitudinal section.

DETAILED DESCRIPTION OF THE INVENTION

Figure 6:
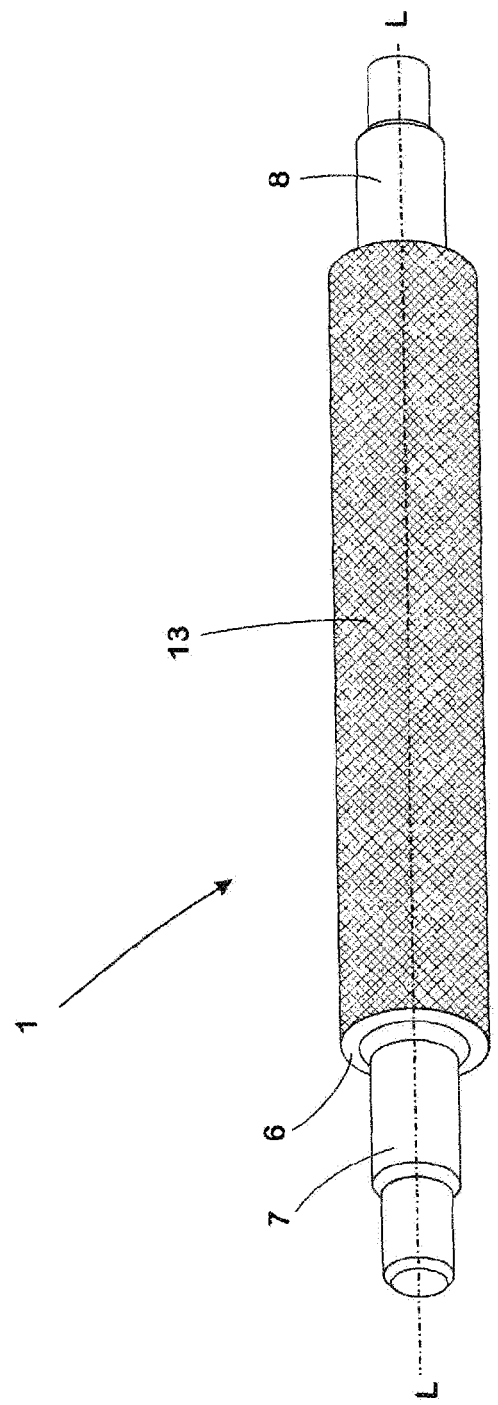
FIG. 6 shows a roll formed from the main body according to FIGS. 5a, 5b in a perspective view.

In order to manufacture the roll 1 according to the invention shown in FIG. 6, a steel melt alloyed according to the composition standardised under the material number 1.7225 is cast to form a billet-formed cast blank 2 which is then brought into the form shown in FIG. 1 through forging in an essentially known manner.

The cast blank 2 is then formed, also through forging, into a main body blank 3 which has the form of a dumbbell, the weights of which are formed through the blank journal sections 4,5 and the bar of which is formed through the barrel section 6 which connects the blank journal sections 4,5 with one another in a single piece (FIG. 2).

After forging, the main body blank 3 undergoes a mechanical machining in which its geometry is optimised such that on the one hand the barrel section 6 possesses the diameter required for the later use of the roll and on the other hand the dimensions of the disc-formed blank journal sections 4,5 are determined such that the material volume contained therein corresponds, with a certain excess, to the volume of the journals 7,8, of the roll 1 which are to be formed out of them later (FIG. 3).

In the next working step, the barrel section 6 is encased with a jacket 9 of sheet steel which forms a tube oriented coaxially with the longitudinal axis L of the main body blank 3. The jacket 9 thereby extends between the associated end faces 10,11 of the blank journal sections 4,5. Its diameter dZ is larger by a certain excess than the diameter dB of the barrel section 6, so that a cavity 12 surrounding the barrel section 6 is formed between the outer circumferential surface of the barrel section 6 and the inner circumferential surface of the jacket 9. The jacket 9 thereby abuts, with its edges, against the associated end face 10,11 of the blank journal sections 4,5, the diameter dZ of which is again larger than the diameter dM of the jacket 9. In the region of the butt joint, the edges of the jacket 9 are welded tight with the respective end faces 10,11 (FIGS. 4a,4b).

Figure 4A:
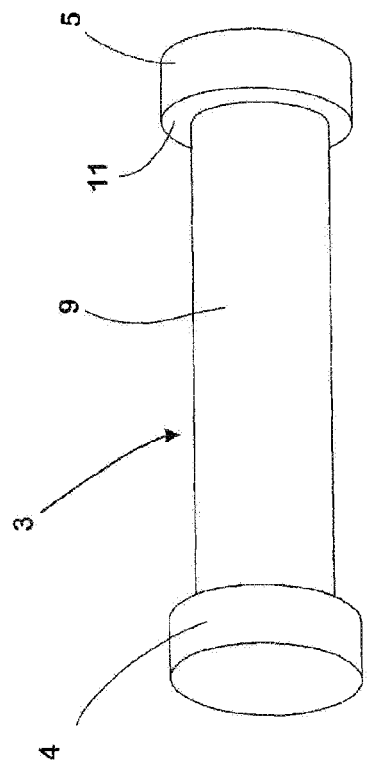
FIG. 4a shows the main body after its barrel section has been encased with a jacket of sheet steel in a perspective view.
Figure 4B:
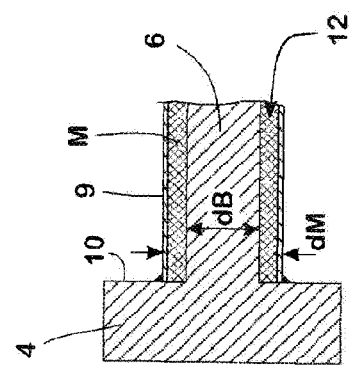
FIG. 4b shows the main body according to FIG. 4a in a longitudinal section through one of its end regions.

An alloy powder M, corresponding in composition to the alloy standardised under the material number 1.3394, is filled into the cavity 12 via a feed pipe, not shown in FIGS. 4a,4b.

Figure 5A:
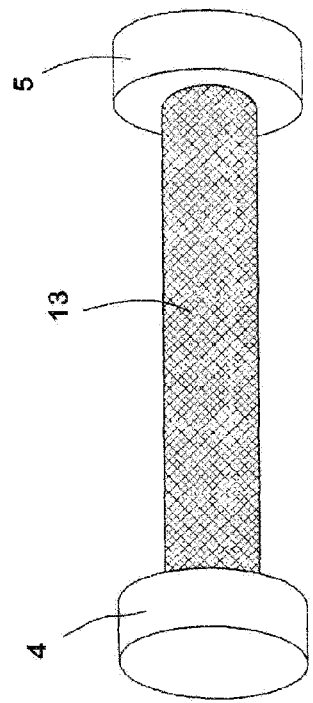
FIG. 5a shows the main body following hot isostatic pressing and following removal of the jacket in a perspective view.
Figure 5B:
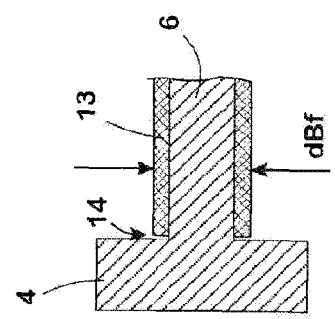
FIG. 5b shows the main body according to FIG. 5a in a longitudinal section through one of its end regions.

The main body blank 3 is then placed in a hot isostatic pressing plant in which the alloy powder M within the cavity 12 is compressed at pressures of approximately 100 MPa and temperatures which lie in the range from 900° C.-1200° C. and sintered to form a dense layer 13 which, as a result of solid body diffusion, forms a substance-to-substance bond with the barrel section 6 of the main body blank 3. Following completion of the hot isostatic pressing process, the jacket 9 is separated from the main body blank 3. A circumferential slot 14 is thereby created through which the layer 13 is also separated from the blank journal sections 4,5 (FIG. 5a,5b).

In the next working step, the blank journal sections 4,5 are reforged in an essentially known manner to form the journals 7,8 of the roll 1. They are then mechanically finished and if necessary subjected to a thermal treatment in order to adjust their mechanical properties.

Accordingly, the finished roll 1 has a main body in which the journals 7,8 and the barrel section 6 are formed in a single piece from a starting material, whereby the journals 7,8 are only formed, through forging and subsequent finishing, following the powder-metallurgical application of the wear-resistant layer 13.

FIGS. 7-10 show variants of main body blanks 3a,3b,3c and 3d prepared for hot isostatic pressing.

In the variant illustrated in FIG. 7, the respective volume V of the blank journal sections 4,5 has been determined according to the formula $V=dZ^2(\pi/4)$ lZ such that, with an addition for processing, it corresponds to the volume of the journals 7,8 of the roll 1 which are in each case to be formed from one of the blank journal sections 4,5. lZ thereby stands for the length of the blank cylinder section 4,5 measured in the direction of the longitudinal axis L, whereas dZ stands for the maximum possible external diameter of the blank journal sections 4,5, from a processing viewpoint and taking into consideration the available HIP plant. The barrel length lB and the barrel diameter dB have also been designed taking into consideration the dimensions of the HIP plant and the customer's specifications. After the correspondingly dimensioned main body blank 3 has been produced in the manner described above, it has been encased in a jacket 9 consisting of sheet steel, the diameter dM of which has been designed, taking into consideration the filling density and the shrinkage of the alloy powder M, such that following the HIP process the required diameter dBf of the finished coated barrel section 6 of the roll 1 is obtained. The steel sheets are welded together in a gas-tight manner, tested for gas-tightness, filled with powder through a filling pipe 15 leading through the jacket 9 or through one of the blank cylinder sections 4,5 into the cavity 12 enclosed by the jacket 9, evacuated and sealed. This main body blank 3 is then brought into the HIP plant and the powder brought to a density of 100% through the combination of pressure, temperature and hold time. Following the HIP process, the blank journal sections 4,5 are brought to the required journal length through free-form forging, without influencing the barrel 6. The journals 7,8 are then ground to the correct dimension, hardened and reground again at the necessary points.

In the main body blank 3b illustrated in FIG. 8, the volume of the blank journal sections 4,5 has been determined as explained above. However, in this case a groove 16 running around the barrel section 6 has been cut into the end face 10,11 of the blank journal sections 4,5 associated with the barrel section 6, into which the jacket 9 is pushed. In the main body blank 3b, the volume of the blank cylinder sections 4,5 and the volume of the barrel section 6 therefore overlap by the depth of the groove 16. This allows a further effective extension of the barrel section 6 or a reduction of the diameter dZ of the blank cylinder sections 4,5. Otherwise, the main body blank 3b undergoes the same working steps as the main body blank 3a explained above.

In the main body blank 3c illustrated in FIG. 9, the blank journal sections 4,5 and the barrel section 6 have been prefabricated as individual pieces in separate working steps. The blank journal sections 4,5 thereby each carry on their end face 10,11 associated with the barrel section 6 a centrally arranged projection 17a,17b which engages in a corresponding recess 18,19 formed in the associated end face of the barrel section 6. The play between the projection and the recess thereby amounts to 0.1-0.5 mm. After the blank cylinder sections 4,5 and the barrel section 6 have been assembled to form the main body blank 3c, the barrel section 6 is encased with the jacket 9 in the manner explained above. The hot isostatic pressing then takes place in the manner likewise explained above. Not only is the wear-resistant layer 13 thereby formed on the barrel section 6, at the same time the blank cylinder sections 4,5 and the barrel section 6 are bonded together in the region of their contacting surfaces, in particular in the region of the projections 17a,17b through solid body diffusion. Following the HIP process, the main body blank 3c also undergoes the working steps already explained above in order to form it into a finished roll.

Finally, the variant represented in FIG. 10 illustrates that the blank cylinder sections 4,5 can also be formed in that journal stubs 20,21 are formed on the barrel section 6 of the main body blank 3d, of which one journal stub 20 has a smaller diameter dS' than the barrel section 6, whereas the journal stub 21 has a diameter dS" which is larger than the diameter dB of the barrel section 6. However, neither of the journal stubs 20,21 has a material volume sufficient to form from them the journals 7,8 of the roll 1 which is to be manufactured. A ring 22,23 is in each case pushed onto the journal stubs 20,21, the outer diameter of which is dimensioned such that it again corresponds to the necessary diameter dZ of the blank cylinder sections 4,5 calculated in the manner described above. The secure mounting of the rings 22,23 on the associated journal stub 20,21 can be guaranteed through shrink-fitting. Alternatively or additionally, a form-locking connection, for example in the form of a thread or a tongue-and-groove connection, can be provided.

In order to ensure that the rings 22,23 and the journal stubs 20,21 form a reliable substance-to-substance bond with one another during the final forging, the main body blank 3d can be enclosed in a gas-tight manner by means of a steel capsule and evacuated over at least 4 hours through an evacuation pipe. The gas-tight compression of the evacuation pipe and forging of the blank into the roll 1 which is to be manufactured then takes place. In this way, oxides can be prevented from forming in the joint gap between the journal stubs 20,21 and the rings 22,23 which would impede substance-to-substance bonding.

REFERENCE NUMBERS 1 roll
2 cast blank
3,3a,3b,3c,3d main body blanks
4,5 blank journal sections 6 barrel section
7,8 journals of the roll 1
9 jacket
10,11 end faces of the blank journal sections 4,5
12 circumferential cavity
13 wear-resistant layer
14 circumferential slot
15 filling pipe
16 circumferential groove
17a,17b projections
18,19 recesses
20,21 journal stub
22,23 rings
dB diameter of the barrel section 6
dBf diameter of the finished coated barrel section
dM diameter of the jacket 9
dS',dS" diameter of the journal stub 20,21
dZ diameter of the blank journal sections 4,5
L longitudinal axis of the main body blank
lZ length of the blank cylinder section 4,5
M alloy powder

The invention claimed is:

1. A method for manufacturing a roll for hot or cold rolling of flat metal products, wherein the roll comprises a barrel section, which is coated with a wear-resistant layer, and two journals, oriented coaxially with the barrel section, each is formed on an opposite end face of the barrel section, the method comprising the following working steps:
 a) providing a main body blank having a barrel section, which has an elongated cylindrical shape with an outer diameter and which consists of a main body material, and
 two cylindrical blank journal sections each of which is formed on an opposite end face of the barrel section and which each has a larger diameter than the diameter of the barrel section, wherein a material volume of the two blank journal sections is at least equal to a volume of the two journals of the finished roll associated with the respective opposite end faces;
 b) encasing the barrel section with a tubular-formed jacket, wherein the jacket having edge regions associated with the blank journal sections is connected, in a sealed manner, to associated end faces of the two blank journal sections and a cavity surrounding the barrel section is formed between the jacket and the barrel section;
 c) filling the cavity with an alloy powder;
 d) hot isostatic pressing of the alloy powder to form a wear-resistant layer coating on the barrel section which forms a substance-to-substance bond with the barrel section and the alloy powder through compression and sintering;
 e) removing the jacket from the coated barrel section;
 f) forming the two blank journal sections into the two journals; and
 g) finishing the barrel section and the two journals.

2. The method according to claim 1, wherein the barrel section of the main body blank carries a journal stub on at least one of the end faces and wherein at least one of the two blank journal sections is created on a relevant end face in that the journal stub is enclosed by a jacket filled with an alloy powder and the alloy powder surrounding the journal stub is compressed and sintered through hot isostatic pressing, so that it forms a substance-to-substance bond with the journal stub and together with the journal stub forms at least one of the two blank journal sections.

3. The method according to claim 2, wherein the alloy powder used for the barrel section is different from the alloy powder used for at least one of the two blank journal sections.

4. The method according to claim 3, wherein the hot isostatic pressing of the alloy powder used for the barrel section and of the alloy powder used for at least one of the two blank journal sections takes place simultaneously.

5. The method according to claim 2, wherein a diameter of the journal stub is greater than the diameter of the barrel section.

6. The method according to claim 1, wherein the main body blank with the barrel section and the two blank journal sections is formed in a single piece through a primary forming method.

7. The method according to claim 1, wherein the main body blank with the barrel section and the two blank journal sections is formed in a single piece through forging of a cast blank.

8. The method according to claim 1, wherein the barrel section and the two blank journal sections of the main body blank are manufactured separately from one another and subsequently inseparably connected to one another.

9. The method according to claim 1, wherein the barrel section of the main body blank carries a journal stub on at least one of the end faces and wherein a ring is fixed to the journal stub which together with the journal stub forms at least one of the two blank journal sections.

10. The method according to claim 1, wherein the filling of the cavity surrounding the barrel section takes place through an opening formed in one of the two blank journal sections.

* * * * *

UNITED STATES PATENT AND TRADEMARK OFFICE
CERTIFICATE OF CORRECTION

PATENT NO.        : 9,782,809 B2
APPLICATION NO.   : 15/321815
DATED             : October 10, 2017
INVENTOR(S)       : Karl Steinhoff et al.

Page 1 of 1

It is certified that error appears in the above-identified patent and that said Letters Patent is hereby corrected as shown below:

On the Title Page

Column 1, item (87), Line 1, delete "WO2014/197466" and insert -- WO2015/197466 --

Column 2, item (57), Line 5, delete "sections" and insert -- sections. --

Signed and Sealed this
Twentieth Day of March, 2018

Andrei Iancu
*Director of the United States Patent and Trademark Office*